US009981846B1

(12) United States Patent
Kuku et al.

(10) Patent No.: US 9,981,846 B1
(45) Date of Patent: May 29, 2018

(54) EXHAUST GAS CONVERSION TO SYNGAS

(71) Applicants: Lai O. Kuku, Gilbert, AZ (US); Melvin (NMI) Mathew, Tempe, AZ (US); Michael P. Woudenberg, Phoenix, AZ (US)

(72) Inventors: Lai O. Kuku, Gilbert, AZ (US); Melvin (NMI) Mathew, Tempe, AZ (US); Michael P. Woudenberg, Phoenix, AZ (US)

(73) Assignee: MILLENIUM SYNTHFUELS CORPORATION, Gilbert, AZ (US)

( * ) Notice: Subject to any disclaimer, the term of this patent is extended or adjusted under 35 U.S.C. 154(b) by 0 days. days.

(21) Appl. No.: 15/699,877

(22) Filed: Sep. 8, 2017

Related U.S. Application Data

(63) Continuation-in-part of application No. 15/401,838, filed on Jan. 9, 2017, now Pat. No. 9,833,739.

(51) Int. Cl.
| | | |
|---|---|---|
| *B01D 19/00* | (2006.01) |
| *C01B 3/38* | (2006.01) |
| *C10L 3/10* | (2006.01) |
| *C10G 2/00* | (2006.01) |
| *B01J 23/28* | (2006.01) |
| *B01D 53/14* | (2006.01) |
| *C01B 32/40* | (2017.01) |
| *C01F 11/02* | (2006.01) |
| *C01F 11/18* | (2006.01) |

(52) U.S. Cl.
CPC ............ *C01B 3/38* (2013.01); *B01D 53/1456* (2013.01); *B01J 23/28* (2013.01); *C10G 2/00* (2013.01); *C10L 3/10* (2013.01); *B01D 2257/304* (2013.01); *B01D 2257/306* (2013.01); *B01D 2257/40* (2013.01); *B01D 2257/50* (2013.01); *C01B 32/40* (2017.08); *C01F 11/02* (2013.01); *C01F 11/18* (2013.01); *C10G 2300/202* (2013.01); *C10G 2300/208* (2013.01)

(58) Field of Classification Search
USPC ............ 423/243; 422/168–170; 48/78, 127.7
See application file for complete search history.

(56) References Cited

U.S. PATENT DOCUMENTS

| | | | | |
|---|---|---|---|---|
| 9,045,337 | B2 * | 6/2015 | Kuku | ........................ C01B 3/342 |
| 9,692,069 | B2 * | 6/2017 | Zietlow | ................. H01M 8/0656 |
| 9,901,876 | B1 * | 2/2018 | Kuku | ...................... B01D 53/96 |
| 2014/0316016 | A1 * | 10/2014 | Jennings | .................. C10G 2/50 |
| | | | | 518/705 |

FOREIGN PATENT DOCUMENTS

GB 2547696 A * 8/2017

\* cited by examiner

*Primary Examiner* — Nina Bhat

(57) ABSTRACT

A fossil fuel fired power plant exhaust gas conversion to syngas is provided. The exhaust gases being emitted from the power plant is normally cleaned and exhausted to the atmosphere. In the subject arrangement, the exhaust gases are directed through a wet scrubber and a reaction chamber to respectively remove sulfur and carbon dioxide. The cleaned exhaust gases are directed through an electrolysis process or a water-gas shift reactor to controllably produce extra hydrogen for use in the cleaned exhaust gas to obtain a desired ratio between the hydrogen and carbon monoxide therein. The resulting desired ratio in the exhaust gas between the hydrogen and carbon monoxide is the syngas that can be used for commercial applications.

14 Claims, 5 Drawing Sheets

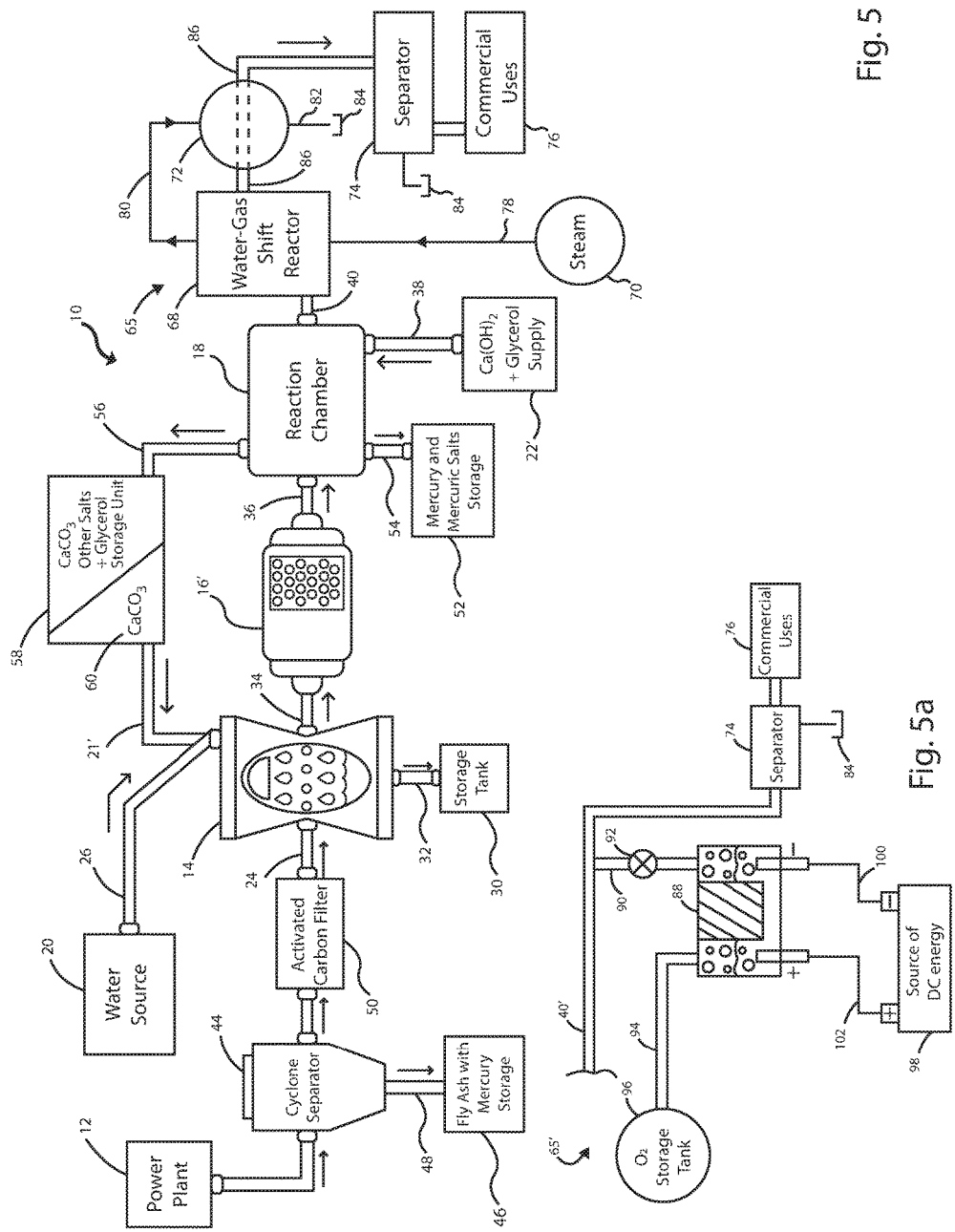

EXHAUST GAS CONVERSION TO SYNGAS

TECHNICAL FIELD

The subject design relates generally to an exhaust gas clean-up system that helps to remove some detrimental exhaust gas compositions and more specifically relates to a process and apparatus to convert cleaned exhaust gas to a syngas operative to power various commercial applications, i.e., for example, fuel for a turbine to generate electrical power, fuel to power motorized vehicles, or a substitute for natural gas.

BACKGROUND

There have been other arrangements that use syngas as a fuel. For example, U.S. Pat. No. 9,045,337 issued on Jun. 12, 2015 to Lai Kuku, one of the inventors listed herein, teaches one example of using syngas as a fuel. The process teaches the use of a water-gas shift or electrolysis to enhance the production of hydrogen therein. However, the arrangement therein clearly teaches using a gasification process that requires extremely high furnace temperature to convert the solid feedstock directly to its gaseous state (syngas). In order to achieve such temperatures, plasma torches are normally required. There is no teaching or suggestions of using an exhaust gas from a fossil fuel fired power plant to produce syngas. Likewise, US Publication 2008/0098654 A1 published on May 1, 2008 to Robert Cherry et al; US Publication 2008/0202028 A1 published On Aug. 28, 2008 to Andrew Tsangaris et al; and US Application 2008/0103220 A1 published on May 1, 2008 to Robert Cherry et al each teaches another example of producing syngas. None of the noted references teach or suggest the arrangement set forth herein.

SUMMARY OF THE INVENTION

According to the present design, an arrangement is provided to convert exhaust gases from a fossil fuel fired power plant to syngas. By directing the exhaust gases from the fossil fuel fired power plant through one of a wet scrubber to remove sulfur oxides therefrom, a reaction chamber to remove carbon dioxide, and the combination of the wet scrubber and the reaction chamber, the cleaned exhaust gases may then be directed through one of a water-gas shift reactor having a sulfur tolerant catalyst therein and an electrolysis process to enrich the hydrogen therein and thus control the ratio between the hydrogen and the carbon dioxide therein. The one of the water-gas shift reactor and electrolysis process functions to produce more hydrogen within the clean exhaust gas. The remaining exhaust gas consisting of hydrogen and carbon monoxide with trace amounts of water is passed through a separator to remove the water therefrom. The remaining mixture of hydrogen and carbon monoxide and possible traces of carbon dioxide is the syngas fuel that may be used for other commercial applications.

Other objects, features, and advantages of the subject design will become more apparent from the following detailed description of the following embodiments and certain modifications thereof when taken together with the accompanying drawings.

BRIEF DESCRIPTION OF THE DRAWINGS

FIG. 5 is another embodiment of the subject design utilizing various aspects of the embodiments set forth above; and FIG. 5a is an alternate embodiment of a portion of FIG. 5.

DETAILED DESCRIPTION

Figure 1:
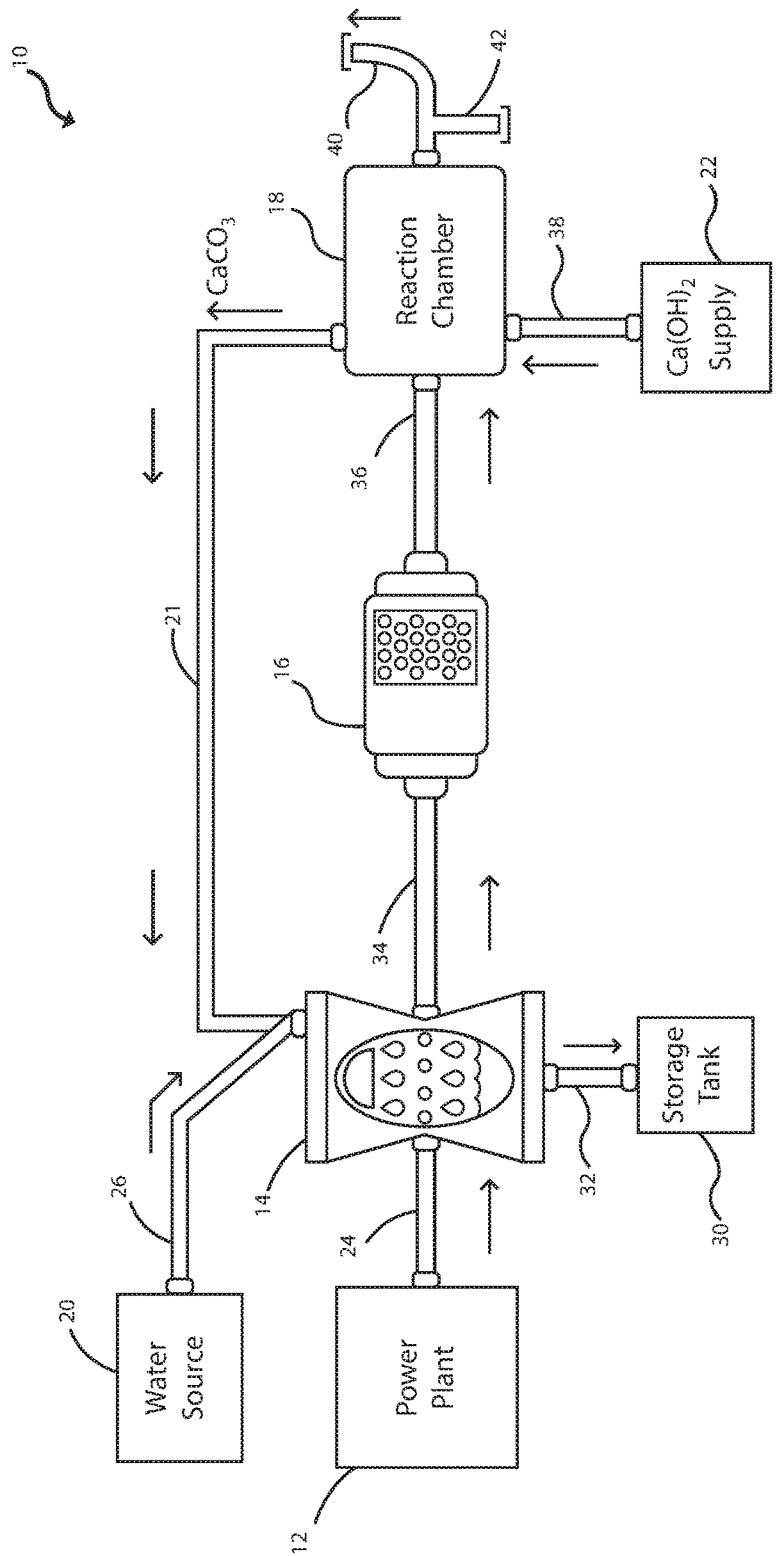
FIG. 1 is a partial flow chart and a partial diagrammatic representation of one embodiment of the subject design.

Referring to FIG. 1 of the drawings, an exhaust gas clean-up system 10 is provided. The exhaust gas clean-up system 10 is connected to the exhaust of a typical fossil fuel fired power plant 12. The exhaust gas from the fossil fuel fired power plant 12 contains various percentages of water ($H_2O$), nitrogen (N), sulfur dioxide ($SO_2$), carbon dioxide ($CO_2$), and nitrogen oxides ($NO_2$). There could be minimal amounts of carbon monoxide (CO) depending on the purity of the fossil fuel being used. The gas clean-up system 10 includes a wet scrubber 14, a catalytic converter 16, a reaction chamber 18, a source of water 20, a source of chemically produced compound connecting line 21, and a source of reacting compound 22.

The wet scrubber 14 is connected to the exhaust of the power plant 12 by an exhaust gas connection line 24 and to the source of water 20 by a water connection line 26. The source of the chemically produced compound is, in the subject arrangement, the reaction chamber 18 is connected to the wet scrubber by the compound connection line 21. The chemical reaction within the wet scrubber 14 produces a usable by-product and acts to remove the sulfur by the chemical reaction between the sulfur dioxide in the exhaust gas, the slurry of water and calcium carbonate as seen below:

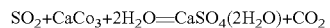

$$SO_2 + CaCo_3 + 2H_2O = CaSO_4(2H_2O) + CO_2$$

This reaction consumes calcium carbonate, water, and oxygen in order to convert sulfur dioxide into $CaSO_4(2H_2O)$ which can be utilized in various ways as gypsum. The by-product of gypsum is directed to a holding tank 30 by a bypass line 32. This reaction cleans up the sulfur dioxide that is contained in the exhaust gas.

The chemically modified exhaust gas is now directed to the catalytic converter 16 by the converter connecting line 34 further chemically modifying the exhaust gas. The catalytic converter 16 can be a typical catalytic converter used in most automobiles. However, a platinum converter with an internal honeycomb arrangement is more effective even though the use of the platinum converter does not depart from the essence of the subject invention. Even though the catalytic converter 16 is shown upstream of the reaction chamber 18, it is recognized that it could be located downstream of the reaction chamber 18 without departing from the essence of the subject arrangement. The catalytic converter would still function as described hereafter.

Within the subject catalytic converter 16, the nitrogen oxides are converted into nitrogen (N) and oxygen ($O_2$). The residual carbon monoxide (CO) may be converted into carbon dioxide ($CO_2$) and water ($H_2O$). The major difference between the use of fossil fuel, as used herein, and gas fuel as used in automobiles is that the burning of fossil fuel does not produce hydrocarbons like the burning of gasoline in automobiles. The burning of gasoline is responsible for the production of large amounts of carbon monoxide (CO) which usually are not present in fossil fuels. Even though catalytic converters are used in automobiles to reduce and/or remove carbon monoxide and hydrocarbons, these gasses are not present in the subject exhaust gas. If they happen to be present, they will only be in minimal amounts. At this point within the design, the nitrogen oxides ($NO_2$) and the sulfur oxides ($SO_2$) have been addressed and that which is left is nitrogen gas (N), water ($H_2O$), carbon dioxide ($CO_2$), and oxygen ($O_2$).

In order to eliminate carbon dioxide ($CO_2$) emissions as well as provide the wet scrubber 14 with the chemically produced compound, i.e. calcium carbonate ($CaCO_3$) and water, the further chemically modified exhaust gas is passed to the reaction chamber 18 through a reacting connection line 36. The source of reacting compound, i.e. calcium hydroxide ($Ca(OH)_2$), is introduced in the reaction chamber 18 through a reacting compound line 38.

The chemical reaction within the reaction chamber is as follows:

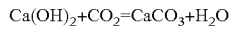

$$Ca(OH)_2 + CO_2 = CaCO_3 + H_2O$$

The calcium carbonate ($CaCO_3$) and water are directed from the reaction chamber 18 to the wet scrubber 14 as the source of chemically produced compound and to add water thereto also. The source of chemically produced compound and water from the reaction chamber 18 are returned through the source of compound connecting line 21. The volume of calcium carbonate and water being bypassed from the reaction chamber 18 to the wet scrubber 14 through the source of compound connecting line 21 will normally be sufficient to continue the operating process without the need for the water source 20.

At this point in the process, the final chemically modified exhaust gas can be safely emitted into the atmosphere through an exhaust line 40. The modified exhaust gas may contain trace/small amounts of oxygen, carbon monoxide, nitrogen, carbon dioxide, nitrogen oxide, and hydrogen. Any water that is passing through the exhaust line 40 can be bypassed to a water tank 42.

Figure 2:
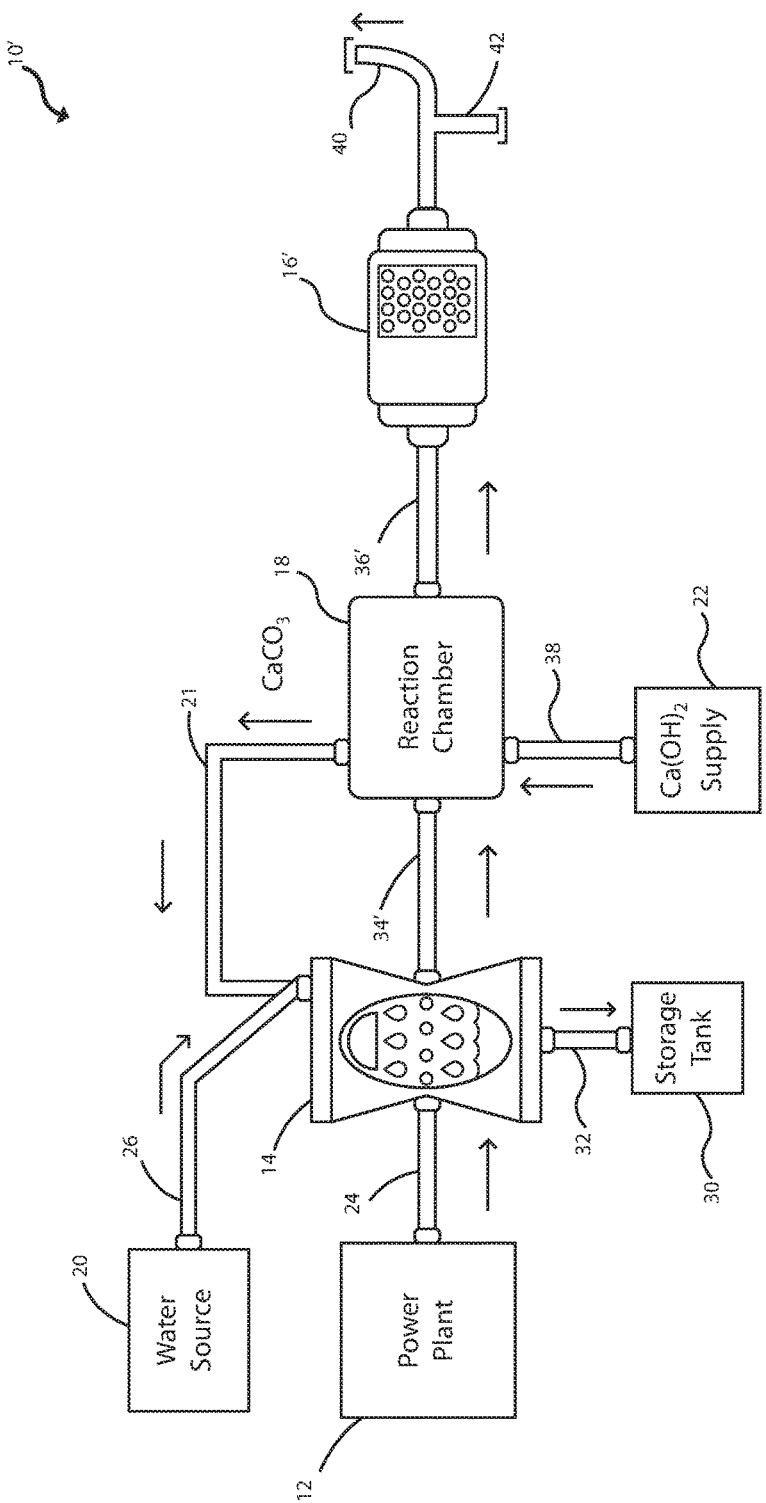
FIG. 2 is a partial flow chart and a partial diagrammatic representation of another embodiment of the subject design.

Referring to the embodiment of FIG. 2, like elements have like element numbers and moved/modified elements has like element numbers with a 'prime' symbol attached thereto In the embodiment of FIG. 2, the catalytic converter 16 of FIG. 1 has been moved from a location upstream of the reaction chamber 18 to a location downstream thereof between the downstream side of the reaction chamber 18 and the atmosphere. All aspects from the embodiment of FIG. 2 function in the same manner as that of FIG. 1. Since the reaction chamber 18 serves to eliminate carbon dioxide present and the catalytic converter 16 eliminates nitrogen oxides, the exhaust gas is now safe to vent it to the atmosphere.

Figure 3:
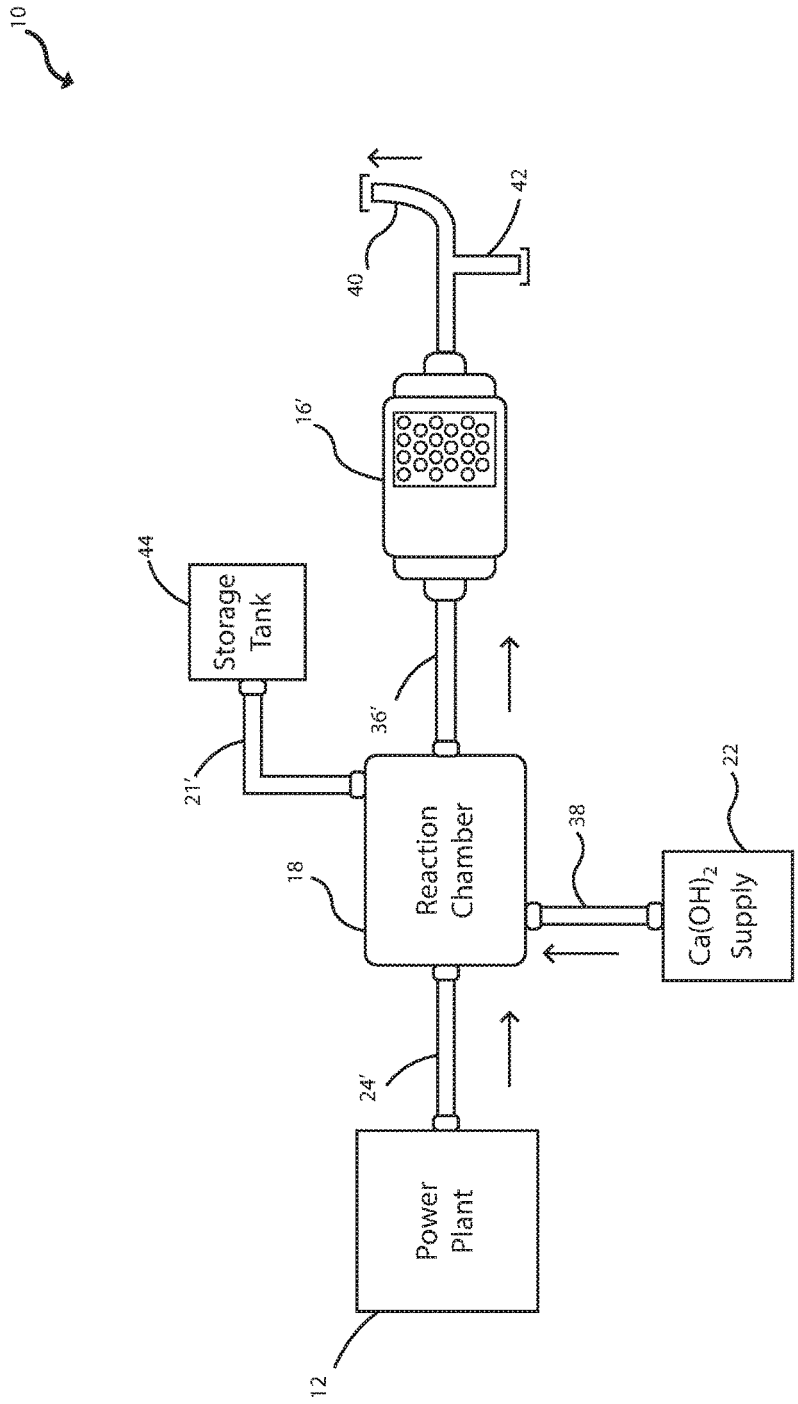
FIG. 3 is a partial flow chart and a partial diagrammatic representation of yet another embodiment of the subject design.

Referring to the embodiment of FIG. 3 as compared to FIG. 1, like elements have like element numbers and moved/modified elements has like element numbers with a 'prime' symbol attached thereto.

In the embodiment of FIG. 3, the wet scrubber 14 has been deleted and the catalytic converter 16 has been moved to a location downstream of the reaction chamber 18. The calcium carbonate ($CaCO_3$) and water being bypassed from the reaction chamber 18 in FIGS. 1 and 2 are being directed through the chemically produced compound line 21' to a storage tank 44. This calcium carbonate and water can be further processed as needed to extract calcium carbonate or to produce a gypsum product. The chemical reaction that was taking place in the wet scrubber 14 of FIGS. 1 and 2 is also taking place in the reaction chamber 18. Consequently, in most applications, the wet scrubber 14 is not needed. As previously noted with respect to FIG. 1 and FIG. 2, the catalytic converter 16' functions in the same manner as that described in FIG. 1 and FIG. 2.

Figure 4:
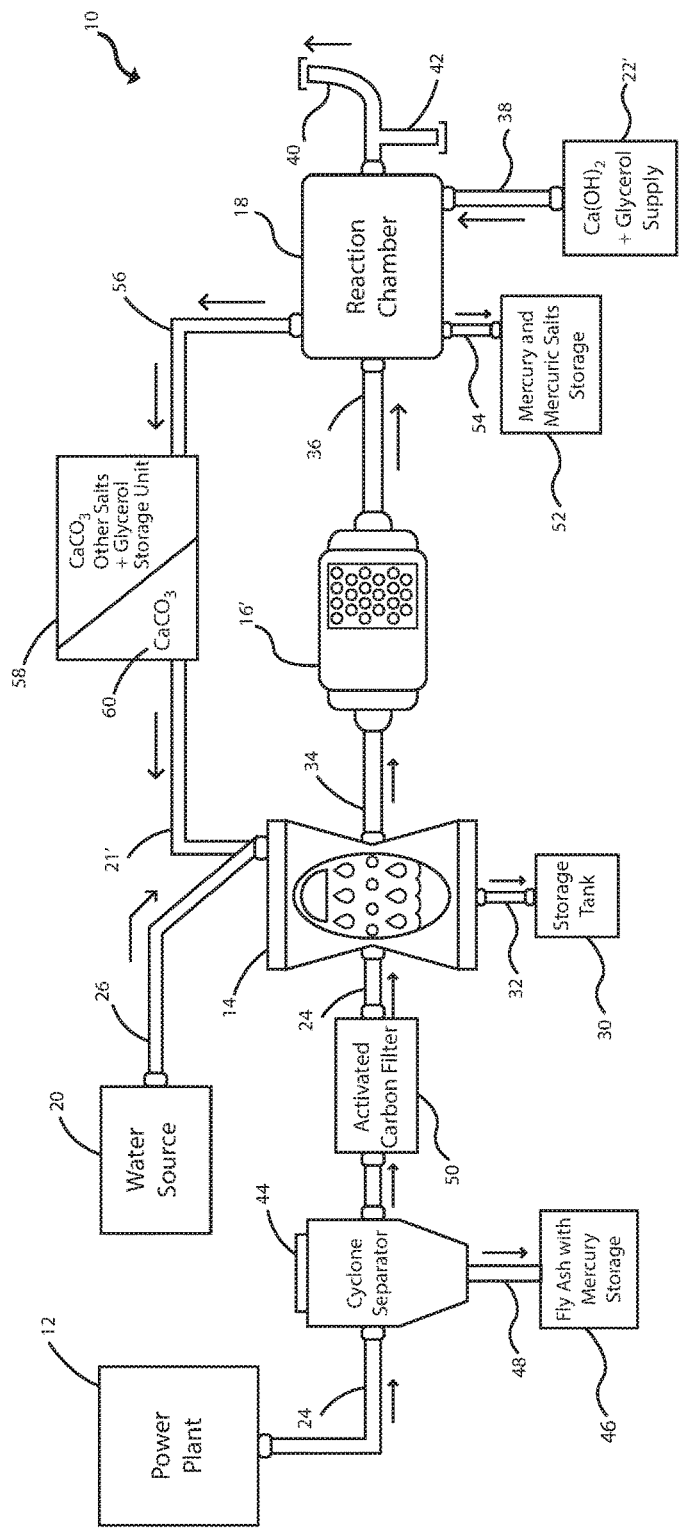
FIG. 4 is a partial flow chart and a partial diagrammatic representation of still another embodiment of the subject design.

Referring to the embodiment of FIG. 4, as compared to FIG. 1 like elements have like element numbers and modified elements have a 'prime' symbol attached thereto.

In the embodiment of FIG. 4, the exhaust gases being emitted from the fossil fuel-fired power plant 12 further include 'fly ash', mercury and mercuric salts. A cyclone separator 44 is added downstream from the fossil fuel-fired power plant 12 and is disposed in the exhaust gas connection line 24. A 'fly ash' with mercury storage 46 is connected to the bottom of the cyclone separator 44 by a connection line 48. Within the cyclone separator 44, the surface of the 'fly ash' serves as an absorbent for the vapors of the mercury and mercuric salts contained in the exhaust gases. At the high volumetric flowrates within the cyclone separator 44, the heavier fly ash', with the absorbed mercury and mercuric salts attached, falls to the bottom where it can be collected in the fly ash with mercury storage 46 through connection line 48. The cyclone separator 44 is effective to remove most of the 'fly ash' from the exhaust gases.

Additionally, an activated carbon filter 50 is added downstream of the cyclone separator 44 and is also disposed in the exhaust gas connection line 24. The activated carbon filter 50 is operative to remove any remaining 'fly ash' and in cooperation with the cyclone separator 44 removes about 75 percent of the mercury and mercuric salts. The partially cleaned exhaust gases continue downstream to the wet scrubber 14 and the catalytic convertor to the reaction chamber 18 as previously set forth above in FIG. 1-3.

The calcium hydroxide supply ($Ca(OH)_2$) 22 of FIG. 1 is being modified in the subject embodiment of FIG. 4 and is labeled 22'. The calcium hydroxide storage 22' of FIG. 4 has a mixed portion of calcium hydroxide and a solubilizer. The solubilizer could be of various known solubilizers that are effective to enhance the solubility of the calcium hydroxide contained therein. Even though various solubilizers could be used herein, glycerol is the preferred solubilizer. Furthermore, mercury and mercuric salts storage 52 are added and connected to the reaction chamber 18 by a connection line 54.

Within the reaction chamber 18, the solution formed by the mixing of the calcium hydroxide and the glycerol is introduced in the reaction chamber 18 and reacts with the exhaust gases therein to remove all mercury and mercuric salts. As an example, the mixture of the glycerol and water is about 50 percent water and 50 percent glycerol and when mixed in a 190-liter (50 gallons) barrel and about 1.8 kilograms (4 pounds) of calcium hydroxide is added. It is recognized that the amounts of each element of the mixture could be varied without departing from the essence of the subject invention. Likewise, it is recognized that the volume of the described mixture could be linearly scaled up as the volume of exhaust gases increase. The removed mercury and mercuric salts are removed from the reaction chamber 18 through the connection line 54 to the mercury and mercuric salts storage 52.

During the removal of the mercury and mercuric salts from the exhaust gases, calcium carbonate and other salts are formed and amounts of glycerol are still present. The mixture of elements is discharged through connection line 56 to a Calcium Carbonate, other Salts, and Glycerol Storage Unit 58. Portions of the calcium carbonate is separated from the mixture of elements and stored in a separate compartment 60 thereof. Calcium carbonate is passed from the separate compartment 60 to the wet scrubber 14 through the compound connecting line 21'. The calcium carbonate is an important part of the chemical reaction taking place in the wet scrubber 14 as set forth with respect to FIG. 1.

As with respect to FIG. 1, the embodiments of FIGS. 2, 3 and 4, the cleaned exhaust gas may be safely emitted into the atmosphere through the exhaust line 40.

Referring to the embodiment of FIG. 5, as compared to FIG. 4, like elements have like element numbers and modified elements have a 'prime' symbol attached thereto.

In the embodiment of FIG. 5, all component of FIG. 4 are incorporated into FIG. 5 except the exhaust line 40 does not vent to the atmosphere and to the tank. The tank line 42 is removed and the exhaust line 40 is connected to a hydrogen enrichment arrangement 65 operative to convert cleaned exhaust gas from the fossil fuel fired power plant 12 to a syngas.

The hydrogen enrichment arrangement 65 includes a water-gas shift reactor 68, a source of steam 70, a cooler 72, a separator 74, and a commercial uses storage unit 76.

A connecting line 78 connects the source of steam 70 to the water-gas shift reactor 68. A connecting line 80 connects the water-gas shift reactor 68 to the cooler 72 while a connecting line 82 connects the cooler to a reservoir 84.

A modified gas exhaust line 86 connects the water-gas shift reactor 68 to the cooler 72. The exhaust line 40 extending from the reaction chamber 18 is connected through the water-gas shift reactor 68 to the modified gas exhaust line 86. The modified gas exhaust line 86 extends through the cooler 72 and connects to the separator 74. The cooler 72 is maintained below about 100 degrees C. (ambient temperature) while the source of steam is maintained at about 300 degrees C.

The water-gas shift reactor 68 contains a sulfur tolerant catalyst. The sulfur tolerant catalyst provides a sour shift to mitigate the effect of any trace amounts of sulfur that might be present in the exhaust gas. Even though other sulfur tolerant catalysts could be used, the subject water-gas shift reactor 68 uses a mixture of cobalt and molybdenum. During this reaction (R), as set forth below, additional hydrogen is produced and trace amounts of carbon dioxide may be formed. The ratio of the hydrogen to carbon monoxide within the water-gas shift reactor 68 can be controlled by controlling the steam being directed therethrough. The ratio of the hydrogen to the carbon monoxide is about 2:1. The combination of hydrogen and carbon monoxide in the exhaust gas give the exhaust the same properties of hydrogen rich syngas ($H_2$:CO).

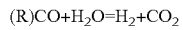

(R)$CO+H_2O=H_2+CO_2$

The hydrogen enriched exhaust gas continues on to the separator 74 to separate any trace amounts of water from the hydrogen and carbon monoxide (syngas) and pass it on to the reservoir 84. The syngas is passed to the commercial uses storage unit 76. It is recognized that the syngas could be connected directly to a power generator or some other commercial use without departing from the essence of the subject design.

In the embodiment of FIG. 5a, as compared to FIG. 5, like elements have like element numbers and modified elements have a 'prime' symbol attached thereto. The main difference between FIGS. 5 and 5a is that the hydrogen enrichment arrangement 65' of FIG. 5a is an alternate embodiment.

The hydrogen enrichment arrangement of FIG. 5a includes an electrolysis process 88 for producing additional hydrogen. The electrolysis process 88 is connected to the exhaust line 40 by a hydrogen connection line 90 having a remotely controlled shut-off valve 92 disposed therein. An oxygen connection line 94 connects the electrolysis process 88 to an oxygen storage tank 96. A source of direct current energy 98 is connected to a cathode 100 (−) and an anode 102 (+) of the electrolysis process 88. Downstream of the connection of the hydrogen connection line 90 with the exhaust line 40, the exhaust line 40 connects to the separator 74. The fluid within the electrolysis process 88 is a mixture of water and salts, however, it is recognized that pure water or other liquids could be used. The electrolysis process 88 functions to controllably separate the water molecules into hydrogen and oxygen resulting in an increase of free hydrogen within the electrolysis process 88. The oxygen is stored in the oxygen storage tank 97 for commercial uses. The separated hydrogen is controllably directed through the hydrogen connection line 90 and blends with the exhaust gas contained therein. It is desirable to provide ample hydrogen to achieve a predetermine ratio between the hydrogen and the carbon monoxide contained therein. A desired ratio is about two hydrogens to one carbon monoxide. The desired ratio of hydrogen and carbon monoxide along with trace amounts of water is passed to the separator 74. In the separator 74, the water is passed to the tank 84. The remaining modified exhaust gas in the form of syngas ($H_2$:CO) is delivered to the commercial uses storage tank 76.

INDUSTRIAL APPLICABILITY

The subject processes set forth herein for exhaust gas clean-up provides a simple, safe, cost effective and an excellent process for removing various one of the above noted detrimental compounds/elements from the exhaust of a fossil fuel fired power plant 12.

By directing the exhaust gas from the fossil fuel fired power plant 12 through any of the three embodiments presented herein, the detrimental compounds previously submitted are removed. With respect to FIG. 1, the wet scrubber 14 having a solution of water, calcium carbonate ($CaCO_3$), oxygen ($O_2$), and sulfur dioxide ($SO_2$) therein, the sulfur is chemically removed and the byproduct of gypsum slurry ($CaSO_4(2H_2O)$) is directed to a storage tank 30. During the reaction within the wet scrubber 14, the calcium carbonate ($CaCO_3$), water ($H_2O$), and oxygen ($O_2$) is consumed to convert the sulfur dioxide ($SO_2$) to the gypsum slurry ($CaSO_4(2H_2O)$). Even though the wet scrubber 14 is connected to the remote source of water 20, the water coming from the reaction chamber 18 and directed to the wet scrubber 14 through the source compound connection line 21 during the production of the calcium carbonate ($CaCO_3$) is normally sufficient.

The chemically modified exhaust gas is passed through the catalytic converter 16 to provide chemical reaction like that of catalytic converters in automobiles. With the exception, the exhaust gases in fossil fuel fired power plants do not contain any appreciable amounts of carbon monoxide and is free of hydrocarbons. As previously stated, within the catalytic converter 16, the nitrogen oxides ($NO_2$) converts into nitrogen gas (N) and oxygen ($O_2$). The only things left at this point to treat is carbon dioxide ($CO_2$), nitrogen gas (N), water and oxygen. In order to reduce the carbon dioxide ($CO_2$) emissions as well as provide calcium carbonate ($CaCO_3$) for the wet scrubber, the exhaust gas is passed through the reaction chamber 18 that has calcium hydroxide (Ca(OH)$_2$) added therein. In the subject embodiment, the volume of calcium hydroxide (Ca(OH)$_2$) needed is approximately 962 g per 2350 L of incoming exhaust gas from the power plant 12. Within the reaction chamber 18, the chemical reaction of the calcium hydroxide (Ca(OH)$_2$) and carbon dioxide (CO$_2$), as set forth above, generates the calcium carbonate (CaCO$_3$) and water as needed in the wet scrubber 14. During this chemical reaction, the carbon dioxide (CO$_2$) level is eliminated or at least reduced to trace amounts. During the chemical reaction within the reaction chamber 18, for every 285.88 L of carbon dioxide (CO$_2$), it requires 953 g of calcium hydroxide (Ca(OH)$_2$). When the exhaust gas from the power plant 12 is low in sulfur, less calcium carbonate (CaCO$_3$) is being consumed in the wet scrubber 14. Since calcium carbonate (CaCO$_3$) is being generated in the reaction chamber 18 and fed to the wet scrubber 14 through the connecting line 21, the concentration of calcium carbonate (CaCO$_3$) within the wet scrubber is higher than normal. Consequently, if the exhaust gas from the power plant 12 is higher in sulfur, the extra concentration of calcium carbonate (CaCO$_3$) can be readily used without adding additional calcium carbonate (CaCO$_3$).

As previously noted with respect to FIGS. 2 and 3, the location of the catalytic converter 16 in the exhaust gas stream is not critical. The function of the catalytic converter 16 remains the same as it was in FIG. 1. The removal of the wet scrubber 14 does not inhibit the removal thereof in most applications since the same function is being performed in the reaction chamber 18. However, it is recognized that the wet scrubber 14 could be utilized as needed.

With respect to the embodiment of FIG. 4, if mercury and mercuric salts and/or large amounts of 'fly ash' are being emitted from the fossil fuel-fired power plant 12, the cyclone separator 44 is effective to remove the vast majority of the 'fly ash' and collect the trapped 'fly ash' in the 'fly ash' with mercury storage 46. Much of the mercury and mercuric salts vapors contained in the exhaust gases are absorbed on the surface of the 'fly ash' and remove with the trapped 'fly ash'. Any remaining 'fly ash' is trapped in the activated carbon filter 50 along with mercury and mercuric salts. The combination of the cyclone separator 44 and the activated carbon filter 50 effectively remove about 75 percent of the mercury and mercuric salts contained in the exhaust gases.

The solution of calcium hydroxide and glycerol in the calcium hydroxide plus glycerol supply is introduced into the reaction chamber 18 and react with the exhaust gases being directed thereacross. Since the solubility of the calcium hydroxide has been enhanced with the introduction of glycerol, the mercury contained therein is substantially, fully converted to heavier mercuric salts and settles to the bottom of the reaction chamber 18 and stored in the mercury and mercuric salts storage 52 for future processing.

Other products of the chemical reaction within the reaction chamber 18, such as calcium carbonate, other salts and glycerol, are passed to the Calcium Carbonate, Other Salts and Glycerol Storage Unit for storage and further processing. A portion of the calcium carbonate is separated from the mixture and stored in the separate compartment 60. The calcium carbonate is directed from the separate compartment 50 through the compound connection line 21' to the wet scrubber 14 to provide the needed calcium carbonate for the chemical reaction tanking place in the wet scrubber 14 as previously set forth in FIGS. 1-3.

With respect to the operation of the embodiment of FIG. 5, the gas clean-up system 10 functions as that of FIG. 4. The cleaned exhaust gas from the reaction chamber 18 is modified in the hydrogen enrichment arrangement 65 to create syngas as clearly set forth below. The cleaned exhaust gas from the reaction chamber 18 is directed through the water-gas shift reactor 68 to customize the H$_2$/CO ratio. Within the water-gas shift reactor 68, the sulfur tolerant catalyst of cobalt and molybdenum mixture in the presence of steam at about 300 degrees C. being directed therethrough functions to produce free hydrogen. The free hydrogen combines with the carbon monoxide contained in the exhaust gas to establish the desired ratio of hydrogen to carbon monoxide. The ratio may be controlled by controlling the rate of the steam being passed therethrough. The water/steam exiting from the water-gas shift reactor 68 is directed to the cooler 72 via connecting line 80 where the water/steam is condensed into all water and passed on to the reservoir 84 via connecting line 82.

The modified gas from the water-gas shift reactor 68 is in the form of trace/small amounts of carbon dioxide, hydrogen, nitrogen dioxide, and carbon monoxide with trace amounts of water mixed therewith. This mixture is directed through the cooler 72 to reduce the temperature therein.

The temperature of the modified gas is lowered within the cooler 72 to below 100 degree C. (ambient temperature). The water is separated from the mixture in the separator 74 and passed to the reservoir 84. The remaining exhaust gas consist of hydrogen and carbon monoxide with possible trace amounts of carbon dioxide to form the desired syngas. The resulting syngas is utilized for various commercial uses as set forth above.

It is recognized that the water-gas shift reactor 68 may be located upstream of the wet scrubber 14 without departing from the essence of the subject design. However, due to the possible presence of large amounts of sulfur being in the exhaust gases upstream of the wet scrubber 14, it may be preferred to have the water-gas shift reactor downstream of the reaction chamber 18. The amount of sulfur in the exhaust gas may be the determining factor.

It is further recognized that other types of hydrogen enriching arrangement 65 may be used, based on the chemical make-up of the exhaust gas being emitted from the power plant 12, instead of the water-gas shift reactor 68 used herein.

Referring to FIG. 5a, another embodiment of the hydrogen enriching arrangement 65' is set forth. In this arrangement, the electrolysis process 88 is provided to produce extra hydrogen that is needed to produce the desired ratio between the hydrogen and the carbon monoxide in the exhaust gas. The principle of electrolysis is well known in the art. That is, by inducing an electrical current into a partially separated body of water through a cathode (−) spaced from an anode (+), the water molecules split. The cathode separates the hydrogen elements and the anode separates the oxygen elements. The oxygen is passed to the oxygen storage 96 while the hydrogen is passed through the hydrogen connection line 90 to the exhaust gas line 40 to blend with the exhaust gas therein. The exhaust gas line 40 along with the added hydrogen passes to the separator 74 to drain water therefrom as needed. The desired ratio of hydrogen and carbon monoxide (syngas) is passed on to the commercial uses storage tank 76.

In conclusion, this process effectively cleans the exhaust gases from a fossil fuel fired power plant 12 and further modifies the cleaned exhaust gas to convert the cleaned exhaust gas to a syngas. The resulting syngas is then available for various commercial uses.

Other embodiments as well as certain variations and modifications of the embodiment herein shown and described will obviously occur to those skilled in the art upon becoming familiar with the underlying concept. It is to be understood, therefore, that the subject design, as claimed, may be practiced otherwise than as specifically set forth above.

What is claimed is:

1. A process for the production of syngas using cleaned exhaust flue gas from a fossil fuel fired power plant, the cleaned exhaust gas is produced by using one of a wet scrubber containing a cleaning solution of calcium carbonate in water and a reaction chamber containing a cleaning solution of calcium hydroxide in water, the cleaned exhaust gas containing low percentages of carbon dioxide, sulfur dioxide, carbon monoxide, nitrogen oxide, and water, the steps consisting of;
   directing the clean exhaust gas to one of a water-gas shift reactor containing a sulfur tolerant catalyst and an electrolysis process to increase the hydrogen level therein; and
   controlling the ratio of the hydrogen with the carbon monoxide contained therein to establish a desired ratio therebetween.

2. The process as set forth in claim 1 wherein steam is controllably introduced into the water-gas shift reactor and reacts with the sulfur tolerant catalyst for separating the hydrogen from the water and establishing the desired ratio between the hydrogen and the carbon monoxide contained therein, a water/steam solution along with the controlled ratio between the hydrogen and the carbon monoxide exits the water/gas shift reactor.

3. The process as set forth in claim 2 wherein the sulfur tolerant catalyst in the water-gas shift reactor is a mixture of cobalt and molybdenum.

4. The process as set forth in claim 3 wherein the steam introduced into the water-gas shift reactor is maintained at about 300 degrees C.

5. The process as set forth in claim 4 wherein the solution of water/steam exiting the water-gas shift reactor is directed to a cooler to condense the steam/water into water for removal and the hydrogen enriched exhaust gas is directed to the cooler to lower the temperature of the hydrogen enriched exhaust gas.

6. The process as set forth in claim 5 wherein the temperature within the cooler is maintained below 100 degrees C.

7. The process as set forth in claim 5 wherein the cooled hydrogen enriched exhaust gas is directed to a separator to remove any trace amounts of water from the remaining mixture of hydrogen and carbon monoxide to produce syngas.

8. The process as set forth in claim 7 wherein the desired ratio of the hydrogen to the carbon monoxide is about two to one.

9. The process as set forth in claim 7 wherein the syngas is operative to power other commercial applications.

10. The process as set forth in claim 8 wherein the process produces the clean exhaust gas using the combination of the wet scrubber and the reaction chamber to produce the clean exhaust gas.

11. The process as set forth in claim 1 wherein the electrolysis process uses electrical energy for controllably separating the hydrogen from the water therein and mixing the separated hydrogen with the carbon monoxide therein to obtain the desired ratio between the hydrogen and the carbon monoxide.

12. The process as set forth in claim 11 wherein the hydrogen enriched exhaust gas is directed to a separator to remove any trace amounts of water from the remaining mixture of hydrogen and carbon monoxide to produce syngas.

13. The process as set forth in claim 12 wherein the syngas is operative to power other commercial applications.

14. The process as set forth in claim 13 wherein the desired ratio between the hydrogen and the carbon monoxide is about two to one.

* * * * *